Dec. 3, 1968        H. E. RIORDAN        3,413,859
DIGITAL RATE GYRO
Filed Jan. 4, 1965                              4 Sheets—Sheet 1

HUGH E. RIORDAN
INVENTOR.

BY
ATTORNEY

Dec. 3, 1968   H. E. RIORDAN   3,413,859
DIGITAL RATE GYRO
Filed Jan. 4, 1965   4 Sheets-Sheet 2

HUGH E. RIORDAN
INVENTOR.

BY
ATTORNEY

Dec. 3, 1968  H. E. RIORDAN  3,413,859
DIGITAL RATE GYRO

Filed Jan. 4, 1965

HUGH E. RIORDAN
*INVENTOR.*

BY

ATTORNEY

Dec. 3, 1968    H. E. RIORDAN    3,413,859
DIGITAL RATE GYRO
Filed Jan. 4, 1965    4 Sheets-Sheet 4
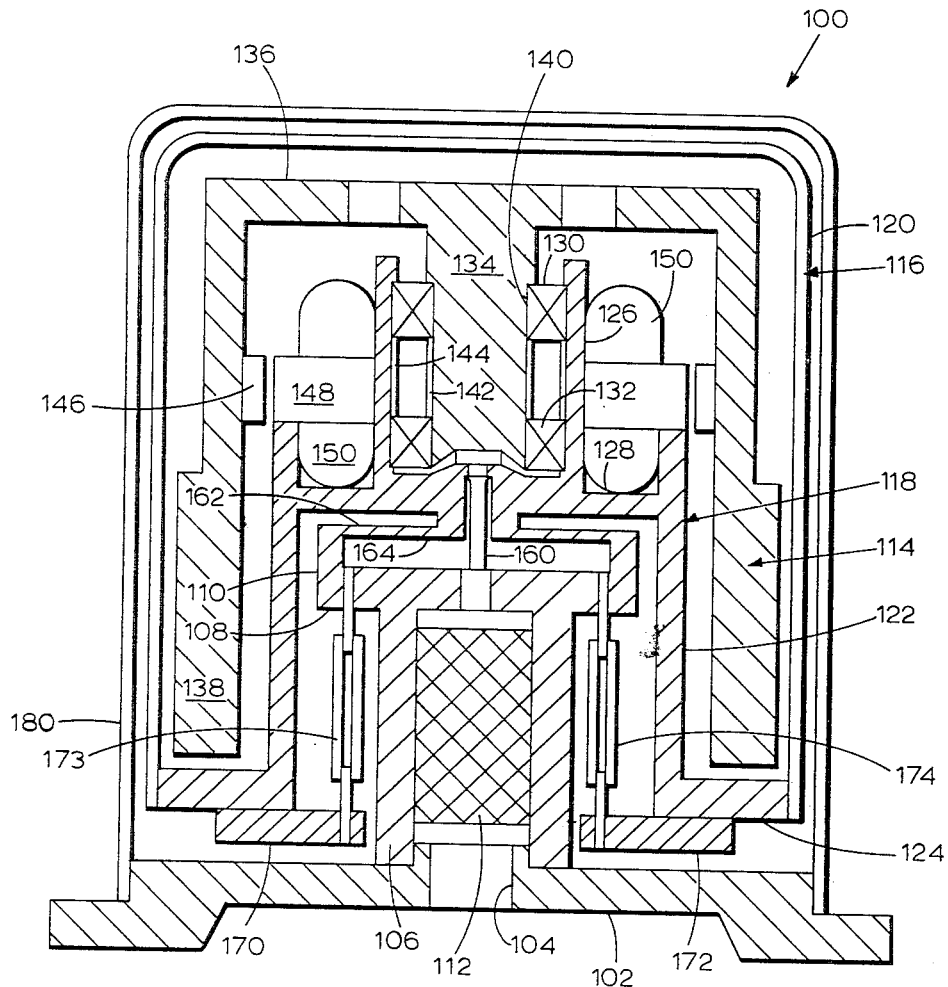
FIG. 8
HUGH E. RIORDAN
*INVENTOR.*
BY
ATTORNEY 3,413,859
DIGITAL RATE GYRO
Hugh E. Riordan, Wyckoff, N.J., assignor to General Precision Systems Inc., a corporation of Delaware
Filed Jan. 4, 1965, Ser. No. 423,148
10 Claims. (Cl. 74—5.4)

The present invention relates to gyros and more particularly to a rate gyro having a digital output.

There presently are two broad application areas for a gyro with a digital or pulse output; namely, in advanced autopilots for vehicles carrying a central high-speed digital computer, and in "strap down" guidance systems. These applications possibly could be satisfied by employing gyros having torquers and pick-offs capable of being used in an electrically restrained rate mode, in conjunction with pulse rebalancing circuits (or analog capture) and voltage to frequency converters. However, the electrical capture scheme requires excessively complex circuitry and very high torquer output which result in high cost and compromised gyro performance. Direct encoding of gyro output using a digital angle encoder also might be considered, but this is not practical because the large gyro output angles required for reasonable resolution would result in poor bandpass and excessive cross coupling.

In accordance with the present invention a rate gyro having a direct digital output is provided which eliminates the disadvantages of the other approaches mentioned above. The direct digital output is obtained by using vibrating beam force transducers similar to the type employed in advanced digital accelerometers to restrain precession of the gyro rotor. Because of the high stiffness-scale factor product of the transducers, output angles can be limited to a few microradians, if desired, and correspondingly broad bandpass and wide dynamic range can be obtained. The supporting electronics is relatively simple and the output is a frequency proportional to input angular rate. Precise input angle information is available in digital form from a simple count of output cycles.

Accordingly it is one object of the invention to provide a gyro which produces a direct digital output.

It is another object of the invention to provide a gyro which does not require torquers or angle pick-offs.

It is a further object of the invention to provide a rate gyro having a direct digital output which enables extremely wide bandpass to be obtained.

It is a still further object of the invention to provide a gyro of the type described above wherein the angular precession of the gyro is infinitesimal so that no significant cross coupling or rectification errors can occur.

It is a still further object of the invention to provide a digital transducer which can be incorporated in existing gyro designs with minor modifications to convert the gyro output to a direct digital output.

Other objects and features of novelty of the present invention will be specifically pointed out or will otherwise become apparent when referring, for a better understanding of the invention, to the following description taken in conjunction with the accompanying drawings, wherein;

FIG. 8 is a cross-sectional view of a two-degree-of-freedom gyro illustrating another embodiment of the invention;

Figure 1:
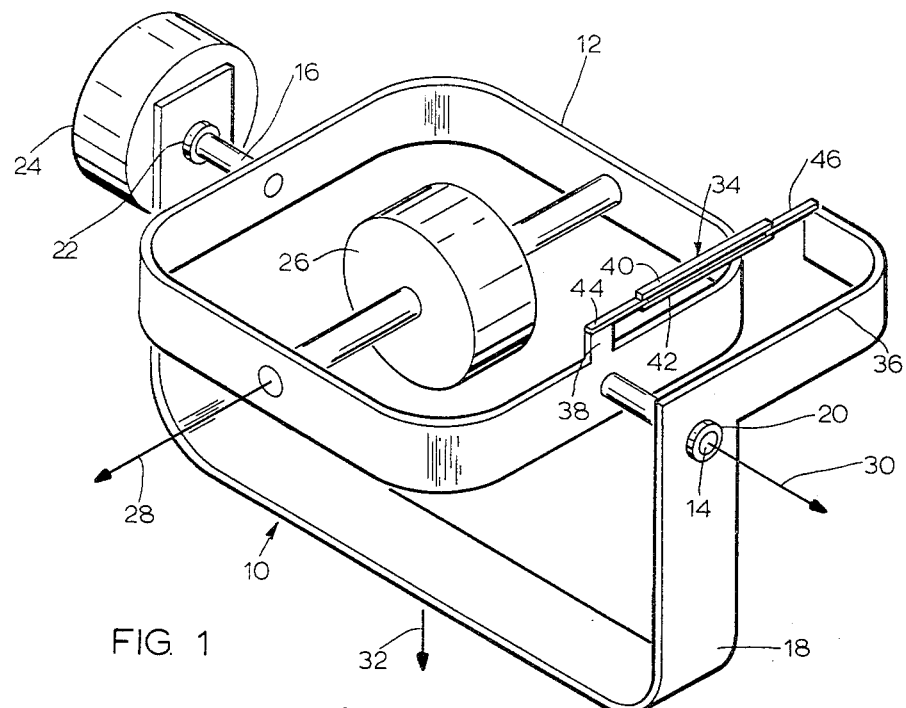
FIG. 1 is a perspective view of a conventional gyro incorporating a vibrating beam transducer in accordance with one embodiment of the invention for producing a digital output.

Referring to FIG. 1, a conventional gyro 10 is illustrated which has been modified to produce a digital output directly in accordance with the present invention. It comprises a gimbal 12 having axially aligned stub shafts 14 and 16 journalled in the upstanding legs of a frame 18 by gimbal bearings 20 and 22, respectively. A conventional grease ring damper 24 is mounted on the frame and operatively connected to the stub shaft 16 to dampen movement of the gimbal 12 in a conventional manner. A rotor housing 26 is mounted within the gimbal 12 in a conventional manner with the rotor spin axis 28 perpendicular to the precession axis 30 and input axis 32 of the gyro. The gimbal 12 is restrained against significant angular movement relative to the frame by a vibrating beam transducer 34 connected between a flange 36 of the frame and a rigid finger 38 projecting from the gimbal 12.

Figure 2:
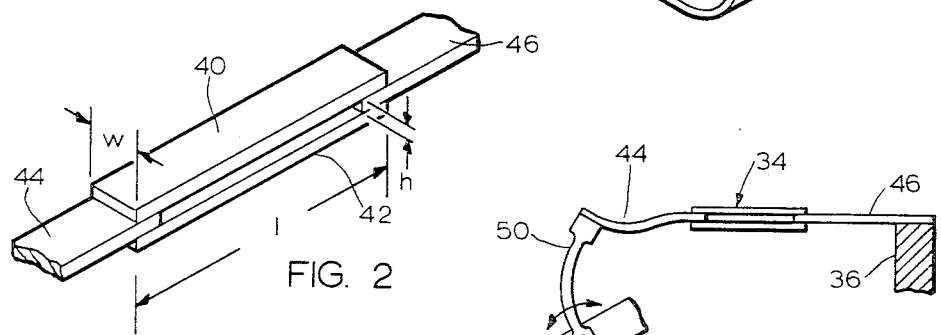
FIG. 2 is a perspective view of the vibrating beam transducer used in the gyro of FIG. 1.

The vibrating beam transducer 34 is of the type employed in advanced digital accelerometers as disclosed in a copending application of Hamilton Southworth, Jr. and John C. Stiles, Serial No. 236,107, filed on November 7, 1962, now U.S. Patent No. 3,269,192 and assigned to the assignee of the present application. Referring to FIG. 2 as well as FIG. 1, the vibrating beam transducer 34 comprises parallel spaced apart beams 40 and 42 connected together in parallel spaced apart relation by end supports 44 and 46. The vibrating beam transducer is mounted on the gyro by attaching the end support 44 to the projection 38 on the gimbal and attaching the end support 46 to the flange 36 on the frame.

Details of the construction of the vibrating beam transducer and the manner in which the beams 40 and 42 are vibrated at their natural frequency to produce the digital output will be described in greater detail hereinafter. In general, however, the vibrating beam transducer has sufficient stiffness to limit precession of the gimbal 12 in either direction to a very small angle, such as a few microradians, if desired. When the gimbal precesses in a clockwise direction as viewed in FIG. 1 the vibrating beam transducer is placed under compression, and when the gimbal rotates in a counter-clockwise direction the vibrating beam transducer is placed under tension. The natural frequency of vibration of the beams 40 and 42 decreases in proportion to an input angular rate which places the vibrating beam transducer in compression, and increases in proportion to an input angular rate which places the vibrating beam transducer in tension. This change in natural frequency is proportional to the input angular rate and is utilized to produce the desired digital output.

Figure 3:
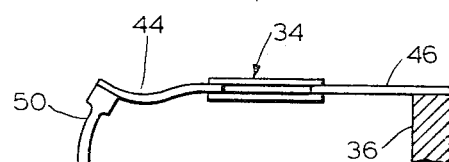
FIG. 3 is a fragmentary view illustrating a modified construction for connecting the vibrating beam transducer of FIG. 1 to the gyro gimbal.
Figure 4:
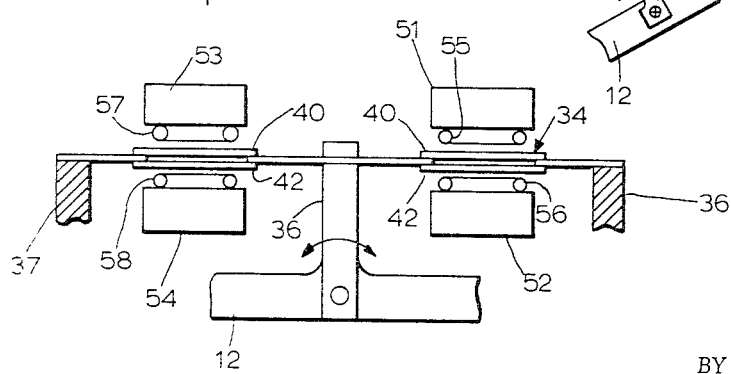
FIG. 4 is a fragmentary view illustrating another modified construction for connecting a pair of vibrating beam transducers between the gyro frame and gimbal in a push pull relationship.

Modifications of the gyro 10 illustrated in FIG. 1 are shown in FIGS. 3 and 4. In FIG. 4 the end support 44 of the vibrating beam transducer 34 is connected to the gimbal 12 by a spring section 15 rather than by the rigid projection 38 illustrated in FIG. 1. The other end support 46 is connected directly to the flange 36 of the frame 18 as before. This reduces the restraint on the gimbal and allows it to precess through a slightly greater angle. In FIG. 4 a second vibrating beam 35 is connected between a flange 37 on the frame 18 and the projection 38 to which the vibrating beam transducer 34 is connected. The arrangement is such that the vibrating beam transducer 34 is placed under compression and the vibrating beam transducer 35 placed under tension when the gimbal 12 precesses in a clockwise direction and the transducer 35 compressed and transducer 34 tensioned when the gimbal precesses in a counter-clockwise direction. The gyro output is taken as the difference frequency of both transducers to cancel the even-order non-linear terms. This modification provides extremely good linearity.

The aforementioned copending application assigned to the assignee of the present application discloses several techniques for vibrating the beams (or tines) of transducers similar to the transducer 34 of the present invention, together with techniques for monitoring the vibrations and producing a digital output. In accordance with one of these techniques, the beams 40 and 42 of each of the transducers 34 and 35 (FIG. 4) are made of a very thin beam of magnetic permeable material so that they can be vibrated at their natural frequency by solenoids 51–54 energized by an AC voltage. In this embodiment the beams 40 and 42 each have a length $l=\frac{1}{4}$ inch, a width $w=\frac{1}{16}$ inch, and a thickness $h=.003$ inch.

As illustrated in FIG. 4 the solenoids 51 and 52 are positioned on opposite sides of the vibrating beam transducer 34 and the solenoids 53 and 54 on opposite sides of the transducer 35. A pair of interconnected pick-up coils 55 and 56 are positioned in the air gaps between the solenoids 51 and 52 and the vibrating beam transducer 34 and a similar pair of interconnected pick-up coils 57 and 58 are positioned in the air gaps between the solenoids 53 and 54 and the vibrating beam transducer 35 so that each of the pick-up coils will have a voltage induced therein having the same frequency as that of the vibrating beam adjacent thereto. Changes in the natural frequency of the vibrating beams when placed under compression or tension, as previously described, will be detected by the pick-up coils 55–58 and the output of the pick-up coils may be applied to a suitable circuit, such as the circuit illustrated in FIG. 5, to indicate the magnitude of the input angular rate. The signal from the pick-up coils 55–58 also is fed back to the solenoids 51–54 to control the frequency of the energizing voltage to maintain the beams vibrating at their natural frequency.

Figure 5:
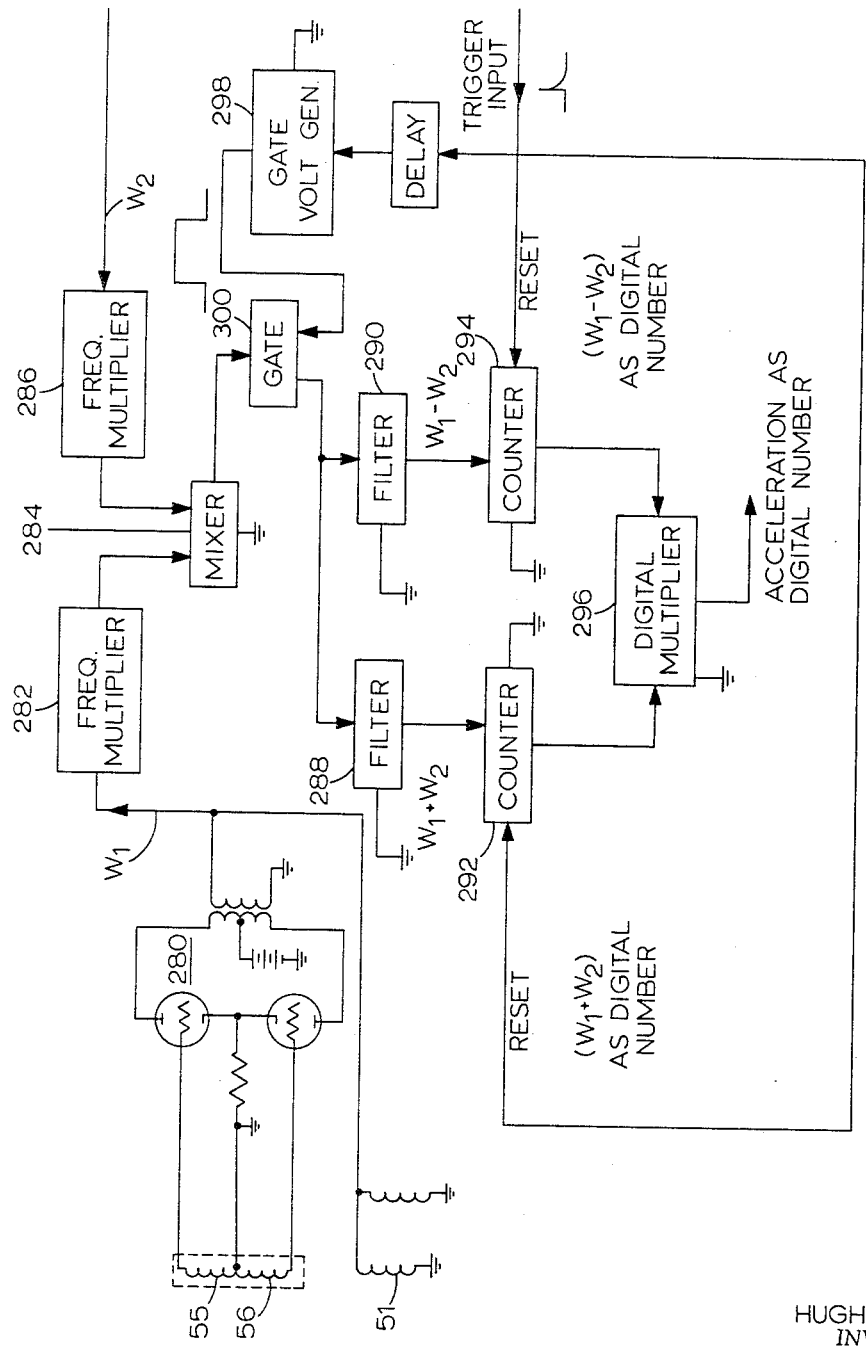
FIG. 5 is a schematic diagram of a circuit for vibrating the transducers of FIG. 4 and producing a digital output.

Referring specifically to FIG. 5, one embodiment of an electrical circuit is illustrated for vibrating and monitoring the vibrating beam transducers 34 and 35 of FIG. 4. The AC voltage induced in the pick-up coils 55 and 56 is amplified by the amplifier 280 and applied to the solenoids 51 and 52 to sustain the vibration of the beams 40 and 42 at their natural frequency. The amplified voltage has a frequency $W_1$ and is applied to a frequency multiplier 282 and then to a mixer 284. An identical feedback circuit (not shown) incorporating the pick-up coils 57 and 58 and the solenoids 53 and 54 is provided to sustain the vibration of the beams of the vibrating beam transducer 35 and an amplified voltage having the frequency $W_2$ is similarly applied to a frequency multiplier 286 and then to the mixer 284 where it is mixed with the frequency $W_1$. The intermodulation of the frequencies $W_1$ and $W_2$ that occurs in the mixer 284 produces the sum and difference frequencies $W_1+W_2$ and $W_1-W_2$ which, after separation by filters 288 and 290, are applied to counters 292 and 294, respectively. The counters convert these frequencies into proportional digital numbers which are then multiplied in a digital multiplier 296 to produce the integral of the input angular rate as a digital number. The interval over which this takes place is determined by the length of the gate voltage produced by a generator 298 which opens the gate 300 admitting the output frequencies of the mixer to the counters 292 and 294. The generation of the gate voltage is controlled by a trigger pulse which also is applied as a reset pulse to the two counters. The pulse is delayed before application to the gate voltage generator in order to allow resetting of the counters to be completed before a new computing period is initiated.

As stated previously precession of the rotor 26 mounted within the gimbal 12 places both beams of one of the vibrating beam transducers 34 under compression and both beams of the other transducer under tension. This causes a decrease in the natural frequency of the vibrating beam transducer placed under compression which is proportional to the input angular rate and an increase in the natural frequency of the vibrating beam transducer which is placed under tension which also is proportional to the input angular rate. By arranging the two vibrating beam transducers 34 and 35 in back to back relationship as illustrated in FIG. 4 so that the natural frequency of one is increased while that of the other is decreased in response to the input angular rate, temperature sensitivity is reduced and the two outputs from the vibrating beam transducers may be combined in a very simple way to produce the frequency output with errors minimized as previously stated. If the only one vibrating beam transducer 34 is employed as illustrated in FIG. 1 its frequency output can be compared with a timing reference in the digital computer to determine the changes in its natural frequency in response to the input angular rate.

Another technique disclosed in the aforementioned copending application for vibrating a transducer similar to the vibrating beam transducer 34 at its natural frequency and monitoring the frequency of vibration is to vibrate the beams 40 and 42 of the transducer electrostatically by passing an AC current therethrough. The beams are preferably made from quartz crystals lapped down to a thickness of .003 inch, with each of the confronting surfaces thereof gold-plated and wired at one end with a 5-mil wire to facilitate electrical connection to the beam. The end supports 44 and 46 preferably are made of quartz to electrically insulate the beams from one another and from the gyro gimbal and frame. The beams 40 and 42 are cemented to the end supports by a suitable cement, such as a watch crystal cement which may be dissolved by acetone. The end supports, in turn, are cemented to the projections 38 and flanges 36 and 37 of the frame (FIG. 4) and, if desired, clamps may be provided to firmly secure the end supports to the projection 38 and flanges 36 and 37.

In the particular embodiment illustrated in FIGS. 1 and 2, the length $l$ of the beams is about one-fourth of an inch, and the width $w$ of each beam is one-sixteenth of an inch, with the clearance between the beams being about .007 inch. To provide beam amplitudes of about $10\mu$ inches, an AC voltage of 40 volts may be impressed across the beams or a DC bias voltage of 40 volts may be impressed across the beams, along with an AC voltage of 10 volts. Voltage frequencies of from 4–8 kc. or more may be used, and the natural frequency of the beams picked up or monitored in any suitable manner, including accoustically, if desired. Circuitry similar to that illustrated in FIG. 5 may be employed to convert the input angular rate of the gyro to digital form and also to provide a feedback circuit for varying the frequency of the voltage applied to the beams to maintain the vibration of the beams at their natural frequency.

Figure 6:
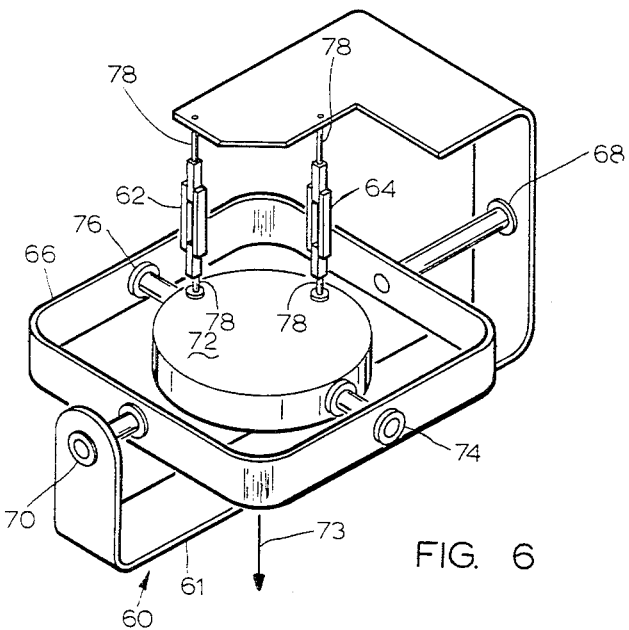
FIG. 6 is a perspective view of a two-degree-of-freedom gyro restrained by a pair of vibrating beam transducers.

Referring to FIG. 6 a conventional two-degree-of-freedom free gyro 60 is illustrated which is equipped with two vibrating beam transducers 62 and 64 to provide digital outputs. The gyro 60 comprises a frame 61 having a gimbal 66 rotatably mounted thereon by gimbal bearings 68 and 70 with a rotor housing 72 rotatably mounted within the gimbal 66 by gimbal bearings 74 and 76. The rotor spin axis 73 is, of course, perpendicular to the output axes defined by the gimbal bearings. The vibrating beam transducer 62 is connected between the rotor and frame to restrain precession about the axis defined by the gimbal bearings 74 and 76, and the transducer 64 connected between the rotor and frame to restrain precession about the output axis defined by the gimbal bearings 68 and 70. Consequently, the output frequency of the vibrating beam transducer 62 can be utilized to provide a digital output representative of the input angular rate about one input axis and the frequency of the vibrating beam transducer 64 utilized to produce a digital output proportional to the input angular rate about the other input axis. In this embodiment the vibrating beam transducers 62 and 64 are identical to the transducer 34 of FIGS. 1 and 2, but are connected to the frame 64 and rotor 72 by flexure wires 78 to accommodate misalignments due to tolerances, deflections and differential thermal expansion.

Figure 7:
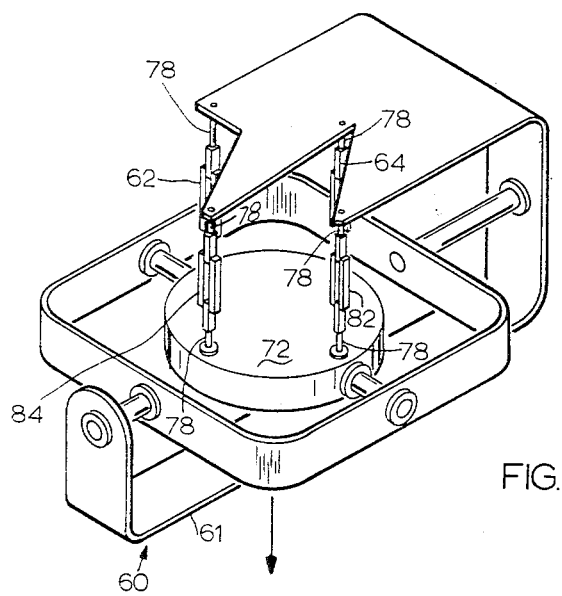
FIG. 7 is a perspective view similar to that of FIG. 6 illustrating a two-degree-of-freedom gyro restrained by four vibrating beam transducers.

Referring to FIG. 7 the gyro 60 of FIG. 6 is illustrated with vibrating beam transducers 82 and 84 added to assist the vibrating beam transducers 62 and 64. The vibrating beam transducers 82 and 84 are connected between the rotor housing 72 and the frame 61 by flexure pivots 78 with the transducer 82 diametrically opposite the transducer 62 and the transducer 84 diametrically opposed to the transducer 64. This arrangement is analagous to the embodiment of FIG. 4 in that one transducer of each diametrically opposed pair will be placed in compression when the other is placed in tension and vice versa so that the output about each output axis will be the difference frequency. As in FIG. 4 this cancels the even-order non-linear terms and improves linearity.

Referring to FIG. 8, a two-axis rate gyro 100 is illustrated having a combination flexure wire and diaphragm in place of the conventional gyro gimbal structure. The gyro 100 comprises a base plate 102 having a central opening 104. A central support 106 is mounted on the base plate 102 above the central opening 104. The central support 106 has a radially projecting flange 108 on the upper end thereof terminating in a cylindrical flange 110. The transducer electronics is contained in a package 112 positioned within the central support 106 so that electrical connections can be made thereto through the opening 104.

The rotor 114 is contained within a rotor housing 116 which comprises a supporting body 118 and a windage shield 120. The body 118 comprises an inverted cup-shaped portion 122 positioned over the central support 106 having a radial flange 124 projecting from the lower end thereof to which the windage shield 120 is secured. A cylindrical bearing wall 126 projects upwardly from a central dividing wall 128 of the body 118 in coaxial alignment with the central opening 104 of the base plate 102.

A pair of spin bearings 130 and 132 are cemented within the bearing wall 126 for rotatably journalling a stub shaft 134 projecting downwardly from an upper end wall 136 of the rotor 114. The rotor has a cylindrical wall 138 depending downwardly from the end wall 136 which is maintained in spaced relation to the radial flange 124 of the supporting body by a shoulder 140 on the central stub shaft 134 engaging the upper spin bearing 130, the upper spin bearing being maintained in spaced relation to the lower spin bearing 132 by a pair of concentric spacer sleeves 142 and 144. A hysteresis ring 146 is mounted on the cylindrical wall 138 between the spin bearings 130 and 132 and a motor stator 148 within the hysteresis ring 146 is mounted on the bearing wall 126 of the supporting body 118. Suitable stator coils 150 are wound on the stator 148.

The supporting body 118 is universally mounted on the central support 106 by a flexure wire 160 and a flexure diaphragm 162, the latter being connected between the upper end of the cylindrical flange 110 and the end face of a boss 164 on the lower face of the dividing wall 128. The flexure wire 160 takes axial load and the diaphragm 164 provides the radial load capacity. Fingers 170 and 172 are fixed to the radial flange 124 of the supporting body 118 and project radially inward therefrom along one output axis of the gyro. A vibrating beam transducer 173 is connected between the finger 170 and the radial flange 108 of the central support 106 and a vibrating beam transducer 174 is connected between the finger 172 and the radial flange 108. A second pair of fingers (not shown) are similarly positioned on the other output axis and fixed to the radial flange 124 in position to cooperate with the radial flange 108 to support another pair of vibrating beam transducers in a similar manner to restrain precession of the gyro about the other output axis.

As in the embodiment of FIG. 7 the difference frequency of the vibrating beam transducers 173 and 174 provides the output about one output axis and the difference frequency of the other pair of vibrating beam transducers (not shown) provides the output about the other output axis. The entire gyro is enclosed by a cover 180 secured to the base plate 102 and, if high performance is required, the entire unit can be evacuated since the transducers preferably are operated in a vacuum. However, for applications of moderate accuracy, operation in air or gas is acceptable.

An inertial grade gyro can be made by enclosing the vibrating beam transducer or transducers in a suitable evacuated container which incorporates a flexible force transmitting element. The transducer, so enclosed, is used to restrain the rotation of a float in a fluid-filled gyro, for example. The flotation of course isolates the sensitive elements of such an instrument against environmental accelerations. Three types of transducer capsules which can be used are illustrated in FIGS. 9, 10 and 11. In each case the critical requirements, in addition to perfect leak tightness, are minimum spring rate of the flexible seal element and insensitivity to ambient pressure changes.

The following primary formulas have been derived for calculating various parameters of the vibrating beam transducers, and gyros employing these transducers. In these formulas $l$, $w$ and $h$ represent the length, width and thickness of a vibrating beam as illustrated in FIG. 2 and the following symbols are employed:

$\sigma$ is the stress in a beam in pounds per square inch;
F is force in pounds;
E is Young's modulus (p.s.i.);
$\Delta f$ is frequency change;
$f_o$ is the unloading base frequency of the beams;
$\gamma$ is the mass density of the beam material in lb. sec.$^2$/in.$^4$;
$\Sigma_f$ is the base frequency instability (c.p.s.);
$K'_3$ is the fixed constant independent of beam design.

AXIAL STRESS IN VIBRATING BEAMS (1) $$\frac{\sigma}{F} = \frac{l}{2wh}$$

FREQUENCY SCALE RATIO (2) $$\frac{\Delta f}{f_o F} = S_F = K_a \frac{l^2}{h^2}\left(\frac{\sigma}{F}\right) = \frac{0.142}{E} \frac{l^2}{h^2}\left(\frac{\sigma}{F}\right)$$

SCALE FACTOR (3) $$\frac{\Delta f}{F} = K_F = \frac{0.146}{\sqrt{E}h}\left(\frac{\sigma}{F}\right) = f_o S_F$$

BASE FREQUENCY (4) $$f_o = 1.03 \frac{h}{l^2}\sqrt{\frac{E}{\gamma}} = K_c \frac{h}{l^2}$$

BIAS CHANGES DUE TO FREQUENCY DRIFT (5) $$F_{b_f} = \frac{\Sigma_f}{S_F}$$

THIRD ORDER NON-LINEARITY (6) $$\frac{F}{F^3} = K'_3 S_F^2$$

For a single degree of freedom gyro restrained by a vibrating beam transducer as illustrated in FIG. 1:

(7) $$Fr = H\dot{\varphi}$$

therefore (8) $$F = H\frac{\dot{\varphi}}{r}$$

where
H is angular momentum (inch lb./sec.)
$\dot{\varphi}$ is input angular rate (rad./sec.)
r is the perpendicular distance from the precession axis 30 to the vibrating beam transducer 34

The basic Equations (1) through (6) now become, for a gyro:

$$(9) \quad \frac{\sigma}{\dot{\varphi}} = \frac{r}{2Hwh}$$

$$(10) \quad \frac{\Delta f}{f_o \dot{\varphi}} = S_{\dot{\varphi}} = K_a \frac{l^2}{h^2}\left(\frac{\sigma}{\dot{\varphi}}\right)$$

$$(11) \quad \frac{\Delta f}{\dot{\varphi}} = K_s = f_o S_{\dot{\varphi}}$$

$$(12) \quad f_o = K_c \frac{h}{l^2}$$

$$(13) \quad \dot{\varphi}_{b_f} = \frac{\Sigma_f}{S_{\dot{\varphi}}}$$

$$(14) \quad \frac{\dot{\varphi}}{\varphi^3} = K'_3 S_{\dot{\varphi}}^2$$

where $\dot{\varphi}_{b_f}$ is the angular rate bias uncertainty.

ANGLE RESOLUTION $$(15) \quad \varphi_o = \frac{l}{f_o S_{\dot{\varphi}}}$$

GYRO NATURAL FREQUENCY $$(16) \quad W_n = \sqrt{\frac{k_1 r^2}{J}}$$

$$(17) \quad k_1 = \frac{F}{\Delta l} = \frac{2F}{\frac{\sigma}{E} l} = \frac{2H\dot{\varphi}}{rl\frac{\sigma}{E}}$$

$$(18) \quad W_n = \sqrt{\frac{2HEr^2}{rl\left(\frac{\sigma}{\dot{\varphi}}\right)}} = \sqrt{\frac{2HEr}{Jl\left(\frac{\sigma}{\dot{\varphi}}\right)}}$$

where
$k_1$ is the axial spring rate of a pair of beams;
J is the output axis moment of inertia of the gyro (in. lb./sec.²).

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, other types of vibrating transducers can be employed in place of the vibrating beam transducers disclosed herein. The aforementioned copending application of Hamilton Southworth, Jr., and John C. Stiles discloses several different types of vibrating transducers which could be employed. Also vibrating strings of the type disclosed in the patent to Appleton 3,098,388 issued on July 23, 1963, could be employed in place of the vibrating beam transducers. Since the vibrating strings collapse when compressed, they would have to be used in back-to-back relationship with both strings pre-tensioned. Referring to FIG. 4, for example, a vibrating string could be substituted for each of the vibrating beam transducers 34 and 35 and pre-tensioned in the null position. With this arrangement the tension in one string would increase and the tension in the other decrease in response to precession of the gimbal 12 in one direction, and this would be reversed in response to precession in the other direction. Of course, the natural frequency of the strings increases when the tension increases and decreases when the tension decreases. For some applications it also would be possible to restrain precession with force transducers, such as piezo-electric crystals, which are not vibrated. Such force transducers would produce an electrical output which varies with the force exerted on the transducer in response to precession of the gyro rotor.

Accordingly the term vibrating beam transducer is used in the following claims to define transducers which can be compressed as well as tensioned. The term vibrating transducer is used to generically designate vibrating beam transducers and other types of transducers which are vibrated, such as vibrating string transducers. The term transducer is used in the following claims to generically define all vibrating and non-vibrating transducers which can be used to convert a force applied thereto by precession of the gyro rotor into an electrical output signal which varies in response to the applied force.

What is claimed is:

1. In combination, a gyro having a rotor supported for precession, vibrating beam transducer means operable in both tension and compression for restraining precession of said rotor, and means for vibrating said transducer means at its natural frequency and producing a frequency output proportional to the gyro input angular rate.

2. In combination, a gyro having a rotor supported for precession, first vibrating unstressed beam transducer means for restraining precession of said rotor in one angular direction, second vibrating unstressed beam transducer means for restraining precession of said rotor in an angular direction opposite to said one direction, electrical means for vibrating said first and second transducer means at their natural frequencies, the natural frequency of vibration of said first transducer means increasing and the natural frequency of said second transducer means decreasing in response to precession in the opposite direction, and means for producing a difference frequency output proportional to the difference between the natural freqencies of said first and second transducer means and proportional to the input angular rate of the gyro.

3. The gyro as defined in claim 2 wherein said gyro is a two-degree-of-freedom gyro wherein said first and second vibrating transducer means restrain precession of the rotor about one output axis, and including third and fourth vibrating unstressed beam transducer means for restraining precession of said rotor about the other output axis, the natural frequency of said third vibrating transducer means increasing and the natural frequency of said fourth vibrating transducer means decreasing in response to precession of said rotor in one direction about said other output axis and the natural frequency of said third vibrating transducer means decreasing and the natural frequency of said fourth vibrating transducer means increasing in response to precession of said rotor in the opposite direction about said other output axis, and including electrical means for vibrating said third and fourth vibrating transducer means at their natural frequencies and producing a difference frequency output proportional to the difference between the frequencies of the third and fourth vibrating beam transducer means and proportional to the input angular rate of the gyro causing precession about said other output axis.

4. A gyro having a digital output comprising a frame, a gimbal mounted on said frame for precession about a precession axis, a rotor mounted on said gimbal for precession therewith, the spin axis of said rotor being perpendicular to said precession axis, and a vibrating beam transducer operable in both tension and compression connected between said frame and gimbal for restraining precession of said rotor.

5. The gyro as defined in claim 4 wherein said vibrating beam transducer is tangentially disposed to a radius line extending perpendicularly through said precession axis, one end of said vibrating beam transducer being connected to said gimbal at a point on said line.

6. The gyro as defined in claim 4 including a second vibrating beam transducer operable in both tension and compression connected between said frame and gimbal, said first vibrating beam transducer being placed under compression and said second vibrating beam transducer being placed under tension in response to precession in one direction and said first vibrating beam transducer being placed under tension and said second vibrating beam transducer being placed under compression in response to precession in a direction opposite to said one direction.

7. The gyro as defined in claim 4 including spring means for connecting at least one end of said vibrating beam transducer to said gimbal.

8. A gyro comprising a support, a rotor housing having a rotor rotatably mounted therein and a motor therein for driving the rotor, flexure wire means coaxially aligned with the spin axis of said rotor for mounting said rotor housing on said support for precessional movement about two mutually perpendicular output axes both normally perpendicular to said spin axis, vibrating beam transducer means operable in both tension and compression for restraining precessional movement of said rotor housing about both of said output axes, and means for vibrating said transducers at their natural ferquencies and monitoring changes in the natural frequency of vibration of said vibrating transducers produced by input angular rates applied to the gyro.

9. The gyro as defined in claim 8 wherein said vibrating beam transducer means comprises four vibrating beam transducers operable in both tension and compression interconnecting said support and rotor housing, one pair of vibrating beam transducers being positioned on one of said output axes and the other pair of said vibrating beam transducers being positioned on the other of said output axes, one vibrating beam transducer of each pair being placed under compression and the other transducer of each pair under tension in response to precession of the rotor housing in one direction, and the other transducer of each pair being placed under compression and said one transducer of each pair under tension in response to precessional movement in a direction opposite to said one direction.

10. The gyro as defined in claim 9 including a flexure diaphragm lying in the plane defined by said output axes and interconnecting said support and rotor housing in a manner to provide radial load capacity, said diaphragm having a central opening therein and said flexure wire means extending through said opening with one end thereof connected to said rotor housing on one side of the diaphragm and the other end thereof connected to said support on the other side of the diaphragm.

References Cited
UNITED STATES PATENTS

| | | | |
|---|---|---|---|
| 2,746,301 | 5/1956 | Henderson | 74—5.6 |
| 2,875,618 | 3/1959 | Altman | 74—5.6 |
| 3,190,129 | 6/1965 | Kritz et al. | 73—517 |
| 3,267,746 | 8/1966 | Scotto | 74—5.6 |
| 3,270,566 | 9/1966 | Cenitch et al. | 74—5.6 |

C. J. HUSAR, *Primary Examiner.*